United States Patent
Yang

(10) Patent No.: US 10,648,605 B2
(45) Date of Patent: May 12, 2020

(54) WATER HAMMER PREVENTION SYSTEM USING OPERATION STATE ANALYSIS ALGORITHM

(71) Applicant: SMTECH CO., LTD, Bucheon-si (KR)

(72) Inventor: Chulsu Yang, Bucheon-si (KR)

(73) Assignee: SMTECH CO., LTD, Bucheon-Si (KR)

(*) Notice: Subject to any disclaimer, the term of this patent is extended or adjusted under 35 U.S.C. 154(b) by 241 days.

(21) Appl. No.: 15/579,207

(22) PCT Filed: Dec. 15, 2015

(86) PCT No.: PCT/KR2015/013743
§ 371 (c)(1),
(2) Date: Dec. 3, 2017

(87) PCT Pub. No.: WO2016/204362
PCT Pub. Date: Dec. 22, 2016

(65) Prior Publication Data
US 2018/0135790 A1 May 17, 2018

(30) Foreign Application Priority Data
Jun. 19, 2015 (KR) ...................... 10-2015-0087749

(51) Int. Cl.
*F16L 55/045* (2006.01)
*G01L 19/00* (2006.01)
(Continued)

(52) U.S. Cl.
CPC .............. *F16L 55/045* (2013.01); *F17D 1/08* (2013.01); *F17D 5/00* (2013.01); *G01L 19/0092* (2013.01);
(Continued)

(58) Field of Classification Search
CPC ..... F16L 55/045; F16L 55/0333; G06F 16/00; G01L 19/12; G01L 19/0092; G01L 2019/0053; F17D 5/00; F17D 1/08
See application file for complete search history.

(56) References Cited

U.S. PATENT DOCUMENTS 4,978,066 A * 12/1990 Fuller ................ B05C 17/08
                                                239/12
5,647,392 A * 7/1997 Roche ................ F17D 1/20
                                                137/207
(Continued)

FOREIGN PATENT DOCUMENTS

KR      10-0742398 B1    7/2007
KR   10-2007-0082616 A   8/2007
(Continued)

OTHER PUBLICATIONS

Yang, KR100781716 (Year: 2007).*
Yang, KR100742398 (Year: 2007).*
Yang, KR100781711 (Year: 2007).*

*Primary Examiner* — Mohammad K Islam
(74) *Attorney, Agent, or Firm* — Im IP Law; Chai Im; C. Andrew Im

(57) ABSTRACT

A water hammer prevention system using an operation state analysis algorithm to prevents water hammer. Data is measured in real time by a pressure sensor and a water level sensor are transmitted to a control unit and stored in a database. The control unit includes an air chamber which controls the operations of an air compressor and an air exhauster to prevent water hammer. The control unit performs calculations according to a water hammer algorithm, and determines the operation states of the air compressor and the air exhauster, and whether the water hammer prevention equipment is operating normally. Active operational control of the water hammer prevention equipment can be (Continued)

performed by applying a data analysis technique thereto, and a failure or operation error can be identified.

4 Claims, 13 Drawing Sheets

(51) Int. Cl.
    *G01L 19/12*     (2006.01)
    *F17D 1/08*     (2006.01)
    *F17D 5/00*     (2006.01)
    *G06F 17/00*     (2019.01)
    *G06F 16/00*     (2019.01)
    *F16L 55/033*     (2006.01)

(52) U.S. Cl.
    CPC .............. *G01L 19/12* (2013.01); *G06F 16/00* (2019.01); *F16L 55/0333* (2013.01); *G01L 2019/0053* (2013.01)

(56) References Cited

U.S. PATENT DOCUMENTS

| | | | | |
|---|---|---|---|---|
| 5,871,027 | A * | 2/1999 | Shimizu | E03F 1/006 137/205 |
| 2003/0066289 | A1* | 4/2003 | Watten | F03B 13/00 60/398 |
| 2005/0241697 | A1* | 11/2005 | Ohmi | F16K 47/02 137/487.5 |
| 2006/0096017 | A1* | 5/2006 | Yamasaki | E03D 9/05 4/420 |
| 2008/0257415 | A1* | 10/2008 | Ohmi | F16K 47/02 137/14 |
| 2010/0313958 | A1* | 12/2010 | Patel | G01F 1/34 137/1 |
| 2010/0327790 | A1* | 12/2010 | Nolemo | H02P 1/42 318/430 |
| 2011/0229345 | A1* | 9/2011 | Konnur | E03B 5/00 417/53 |
| 2012/0255706 | A1* | 10/2012 | Tadayon | F28D 20/0039 165/47 |
| 2013/0038062 | A1* | 2/2013 | Salu | F03B 13/06 290/52 |
| 2014/0166115 | A1* | 6/2014 | Yang | G05D 7/0682 137/12 |

FOREIGN PATENT DOCUMENTS

| | | |
|---|---|---|
| KR | 10-0781711 B1 | 12/2007 |
| KR | 10-2011-0118023 A | 10/2011 |
| KR | 10-1198878 B1 | 11/2012 |

* cited by examiner

FIG. 4

| Site name | Time | Water level | Pressure | State | Abnormal | Operation |
|---|---|---|---|---|---|---|
| A site | 00:00:00 | 49.71 | 7.09 | 01 | 0001 | 0001 |
| ⋮ | ⋮ | ⋮ | ⋮ | ⋮ | ⋮ | ⋮ |

# WATER HAMMER PREVENTION SYSTEM USING OPERATION STATE ANALYSIS ALGORITHM

RELATED APPLICATIONS

This application is a § 371 application from PCT/KR2015/013743 filed Dec. 15, 2015, which claims priority from Korean Patent Application No. 10-2015-0087749 filed Jun. 19, 2015, each of which is incorporated herein by reference in its entirety.

TECHNICAL FIELD

The present invention relates to a water-hammering prevention system and, more particularly, to a water-hammering prevention system based on an operating state analysis algorithm, which is capable of preventing water-hammering by storing data measured in real time by the operating apparatus of water-hammering equipment, constructing the stored data in a database, computing the constructed data according to a water-hammering algorithm, and determining whether the water-hammering equipment operates or not and is normal or not.

BACKGROUND ART

A phenomenon in which pressure within a pipe suddenly rises or suddenly drops due to a sudden change of the velocity of a moving fluid in a pipeline is called a water impact phenomenon (or water-hammering phenomenon).

If a stopped pump is suddenly driven without a proper manipulation of a valve, power is suddenly off during a normal operation, or power is instantaneously blocked by a cutoff valve at the end of a pipeline, the velocity of a moving fluid within the pipeline suddenly changes and thus pressure within the pipeline greatly rises or drop to generate a severe impact, thereby generating water-hammering pressure. In daily life, when the tap water of a washbowl is suddenly locked by one lever while the tap water is used, an exposed water pipe generates a sound along with vibration due to the water-hammering phenomenon. The water-hammering phenomenon has a possibility that it may cause a great accident in a large-sized road/water transmission pipeline that supplies a large amount of water other than a common home. The influence of damage (the stop of water, road/residential area flooding, etc.) attributable to the accident is very great.

As shown in FIG. 1, from a graph in which a change of pressure/water level is changed over time, a normal/safety/water-hammering state can be easily checked from a change in pressure and the water level generated in the pipeline.

A sudden change in pressure is greatly influenced by a change in the velocity of a moving fluid within the pipe. An acting force depending on the size of a cross section may be calculated. The size of the pipe is large and the apparatus is complicated in a common large water transmission line compared to the pipeline for home use. Accordingly, a safe operation is required by incorporating the influence.

A change in pressure generated due to a sudden change in speed does not act on one place, but is delivered along the pipe through a method, such as propagation or reflection, and has an effect. This may be easily understood through the delivery phenomenon of an echo in the air. The air may be easily diffused, but is less influenced by another medium within the pipe and may have a great influence on the pipe for a long time due to the characteristics of water, that is, a non-compression fluid, through the pipe having stiffness of a specific size.

In general, during the normal operation of the pump, as shown in FIG. 2, pressure is maintained like a hydraulic grade line. In a pressure distribution in the pipeline attributable to a power failure or malfunction, in a specific section, dropping pressure is lowered compared to a hydrostatic head. Rising pressure appearing due to the reflection of a pressure wave after a specific time may rise up to a level that exceeds allowable pressure in which the pipe or device can withstand in a worse case. If pressure in the pipe becomes lower than −5~−7 mAq, that is, pressure according to equipment criteria regulated by the Environment Bureau, installing water-hammering prevention equipment must be reviewed because column separation may occur.

As described above, a phenomenon in which a pressure wave generated due to a sudden change in speed or pressure of a moving fluid flowing within the pipe is propagated along the pipeline is called a water-hammering action.

The water-hammering action gives damage to a variety of types of facilities, such as a pump, valve and turbine connected to a pipe, in addition to the pipe, causing the waste of a high cost and time, vibration and noise. Accordingly, thorough preparation for such damage is required upon designing the pipeline design. In accordance with the recent examinations through technical diagnosis or site investigation, accurate design factors have not yet been applied to many facilities (the conduct pipe of a water power plant, a variety of types of water supply facilities including high-capacity wide waterworks equipment, and a variety of types of water pipeline facilities), but a water-hammering equipment has been chiefly installed. Accordingly, the budget is wasted due to excessive equipment or the function of water-hammering reduction equipment does not properly operate due to excessively insufficient equipment capacity.

Accordingly, in order to establish proper measures for this problem, a safe operation needs to be performed by installing a variety of types of water-hammering facilities (the installation of a flywheel, the installation of a surge tank, the installation of a stand pipe, the installation of an air chamber, the installation of an air valve, the installation of a safety valve, a change of a pipeline shape, etc.) (hereinafter, an expression "apparatus" is interchangeably used) capable of reducing and controlling the water-hammering action by carefully deriving important design factors in water-hammering analysis from the beginning of the design.

Recently, there is a need for a technology for previously predicting a dangerous factor by incorporating an accurate design factor into computer computation analysis when equipment or water-hammering equipment is designed in order to secure stability. Regarding a method of reducing water-hammering damage, more accurate analysis is made possible through computation analysis. However, the results of the evaluation for water-hammering equipment are quite different depending on which variable is applied to a prevention apparatus and whether characteristics are incorporated into the prevention apparatus in the water-hammering computation analysis.

Common water-hammering equipment has a problem in storing operating information and requires a lot of time using expensive additional equipment in order to analyze the operating information. Furthermore, in order to install the normal water-hammering equipment, separate processing must be performed on the existing facility or apparatus or many types of equipment must be attached to the facility. Data can be obtained only in a specific period because an experiment apparatus must be installed after the operation of the water-hammering equipment is stopped, and a task must be performed according to a separate schedule because a data acquisition apparatus must be removed after the analysis of data is finished.

In order to reduce water-hammering damage, the water-hammering prevention apparatus must be installed in a site, operating data must be obtained, and the water-hammering prevention apparatus must be developed or driven using the results. If limited information obtained in some sites is applied to the entire system, it is difficult to secure performance that guarantees safety. Furthermore, if a situation is different, the apparatus operates based on previous data, frequently leading to a danger of an accident.

A current water-hammering prevention apparatus company adopts only data that belongs to previous experimental data related to many sites and that has been determined to have the best performance, promotes only such a portion, and incorporates it into the entire system in order to protect all facilities through the same performance. In this case, however, an accident is caused, and equipment that must require the water-hammering prevention apparatus does not obtain satisfactory results for performance from a user. As a result, pieces of equipment as a safety apparatus are shunned by the entire industry and industrial companies, and thus a danger of an accident rises day by day.

Furthermore, the water-hammering action needs to be subject to reasonable analysis because it has many difficulties in analysis. Although the water-hammering prevention apparatus is installed based on the reasonable analysis, it is difficult to obtain a desired effect if systematic management is not performed. It is very difficult to analyze the water-hammering action through simple calculation according to a common numerical calculation method based on the existing water and sewage equipment criteria regulated the Environment Bureau. Accordingly, a method according to a computation analysis program using a computer is chiefly used due to complexity and the difficulty of an analyzed equation. Today, most of practical designers calculate all of contents based on such computation analysis, but still have a difficulty in obtaining an accurate solution.

In the water-hammering action in the pipeline, a moving fluid flowing within the pipe generates a sudden change in speed due to a failure of the pump or a sudden stop attributable to a power failure, a sudden opening/shutting of the valve, etc. Accordingly, pressure within the pipeline is greatly changed. The pipeline and the apparatus are influenced by a phenomenon in which a pressure wave generated at this time propagates.

The water-hammering action gives damage to a variety of types of facilities, such as a pump, valve and turbine connected to a pipe, in addition to the pipe, causing the waste of a high cost and time, vibration and noise. Accordingly, thorough preparation for such damage is required upon designing the pipeline design.

However, in accordance with the recent examinations through technical diagnosis or site investigation, accurate design factors have not yet been applied to many facilities (the conduct pipe of a water power plant, a variety of types of water supply facilities including high-capacity wide waterworks equipment, and a variety of types of water pipeline facilities), but a water-hammering equipment has been chiefly installed. Accordingly, the budget is wasted due to excessive equipment or the function of water-hammering reduction equipment does not properly operate due to excessively insufficient equipment capacity.

Accordingly, in order to establish proper measures for this problem, a safe operation needs to be performed by installing a variety of types of water-hammering facilities (the installation of a flywheel, the installation of a surge tank, the installation of a stand pipe, the installation of an air chamber, the installation of an air valve, the installation of a safety valve, a change of a pipeline shape, etc.).

OBJECT AND SUMMARY OF THE INVENTION

Technical Problem

The present invention has been made to solve the above problems, and an object of the present invention is to provide a water-hammering prevention system based on an operating state analysis algorithm, which can prevent water-hammering by storing data measured in real time by water-hammering equipment in a database (DB), numerically analyzing the stored data according to the operating state analysis algorithm, and determining whether the water-hammering equipment operates or not and is normal or not.

Furthermore, an object of the present invention is to derive a problem by comparing the analysis data of the operating state analysis algorithm with the accuracy of a design factor through a site test and to find a possible solution so that the solution can be practically used.

Technical Solution

A water-hammering prevention system based on an operating state analysis algorithm in accordance with the present invention is configured so that data measured in real time by a pressure sensor and a water level sensor is transferred to a control unit, the control unit includes an air chamber for preventing water-hammering by controlling an operation of an air compressor and an air discharger, and the data transferred in real time by the pressure sensor and the water level sensor is stored in a database (DB) through an operating data unit or transmitted to an external server 500 through a transmission unit (TX), the control unit computes data for an operating state of the air compressor and air discharger transferred by a detection circuit unit 50, a real-time pressure value transferred by the pressure sensor, and a real-time water level value transferred by the water level sensor using the operating state analysis algorithm, and determines whether water-hammering equipment normally operates or not based on the results of the computation so that water-hammering is prevented.

Advantageous Effects

The water-hammering prevention system based on the operating state analysis algorithm according to the present invention has effects in that it can actively control the operation of the water-hammering equipment by applying the data analysis scheme and can propose an accurate operating method by also checking a malfunction or an error of an operation.

Furthermore, the operating state analysis algorithm according to the present invention can secure safety because it can diagnose a failure or malfunction of the water-hammering equipment, and can also reduce a cost for the unnecessary replacement of a facility because it can be used for a long time.

Furthermore, if the value of a variable is repeated in a specific cycle, a periodical change is generated although repair is performed because air leaks. Accordingly, repair and maintenance efficiency can be improved because leakage in other places other than a repaired place can be checked.

Furthermore, a set value according to an automatic operation can be controlled or determined using a change in the variable value of the operating state analysis algorithm with respect to the transmission water capability of a pipe according to the lapse of a long time.

DESCRIPTION OF DRAWINGS

FIG. 4 is a schematic diagram of a time table stored in a database according to an embodiment of the present invention.

BEST MODE FOR INVENTION

Preferred embodiments of the present invention are described in detail with reference to the accompanying drawings.

A water-hammering prevention system based on an operating state analysis algorithm according to the present invention derives a suitable method by taking into consideration a change of a site or operating conditions in the operation of an apparatus for securing stability based on the results of computer computation analysis, predicts an abnormal portion, finds a factor that can guarantee safety, and provides the factor so that it can be used.

The reason why an accident is generated due to water-hammering although a safety apparatus capable of preventing a damage accident of an equipment from water-hammering damage in a site in which a non-compression fluid is transferred lies in a change in the illumination of a pipeline according to the lapse of time or a change in the operating conditions of the equipment, such as the aging of a pump, rather than in the selection of the apparatus.

A water-hammering accident is frequently generated because such a change is not incorporated into the operation of the water-hammering prevention apparatus. Accordingly, it is necessary to take measures, such as a change or repair of the operating method of the water-hammering prevention apparatus so that a change according to the lapse of time in addition to a failure or malfunction of the apparatus can be handled.

In an embodiment of the present invention, the results of computation analysis using a computer are applied to the operation variables of an air chamber type water-hammering prevention apparatus, that is, equipment capable of absorbing rising pressure and dropping pressure while suppressing the generation of the rising pressure and dropping pressure using a proper capacity of air and water within an air chamber.

Figure 1:
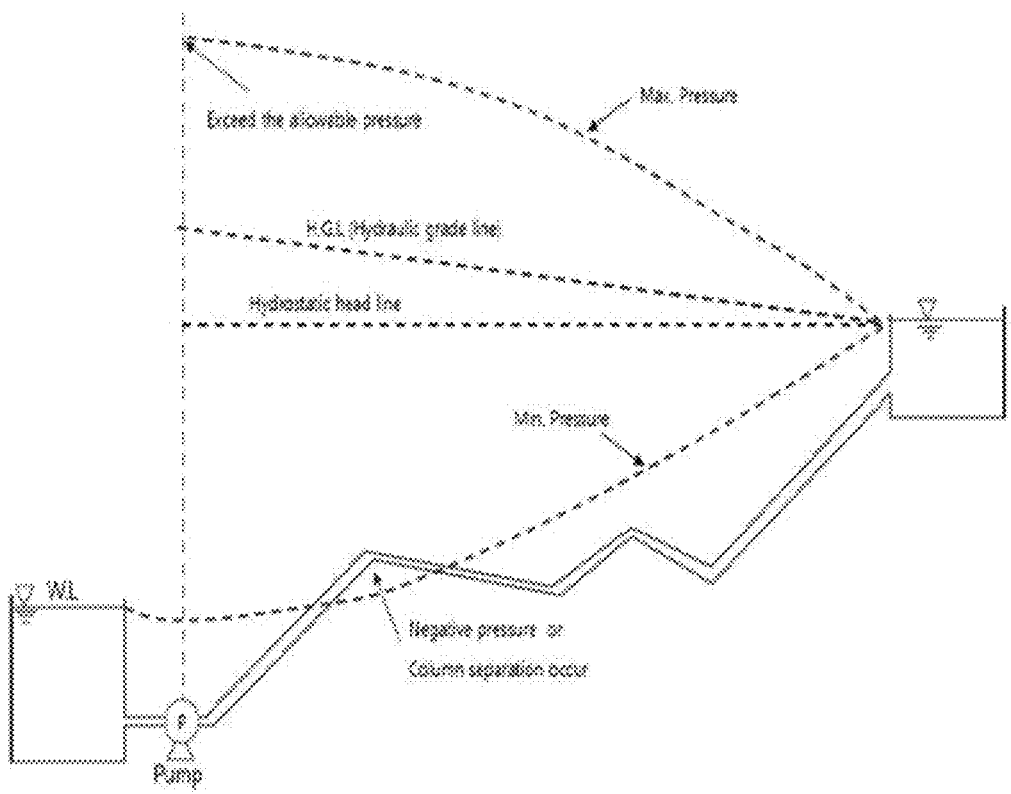
FIG. 1 shows the configuration of water-hammering generated in a normal pipeline.
Figure 2:
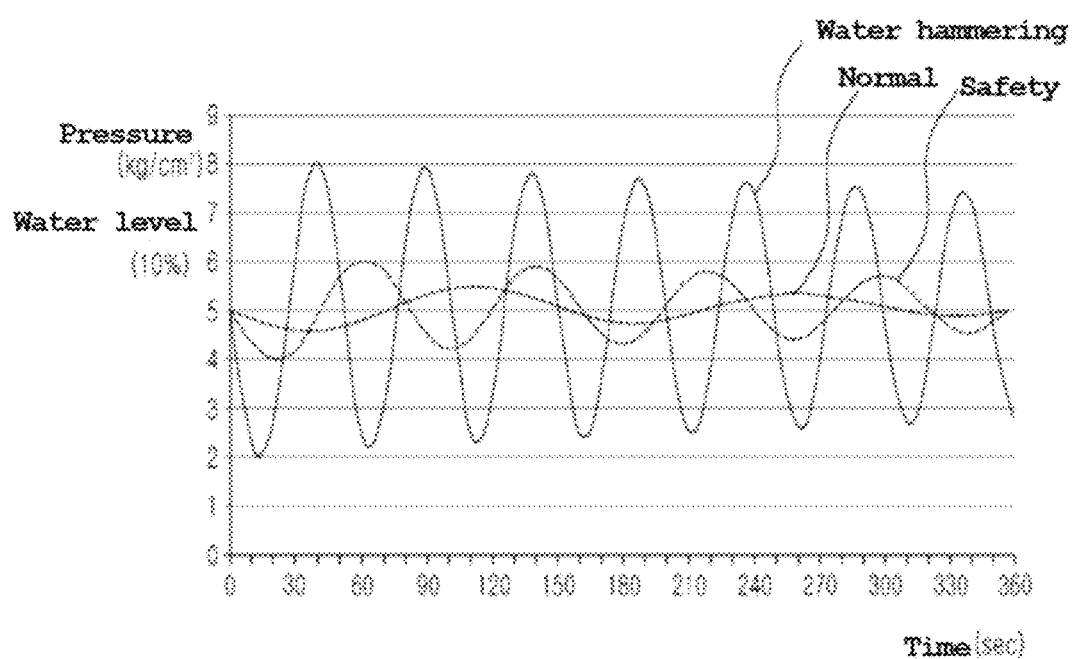
FIG. 2 is a graph showing a change in pressure and water level over time.
Figure 3:
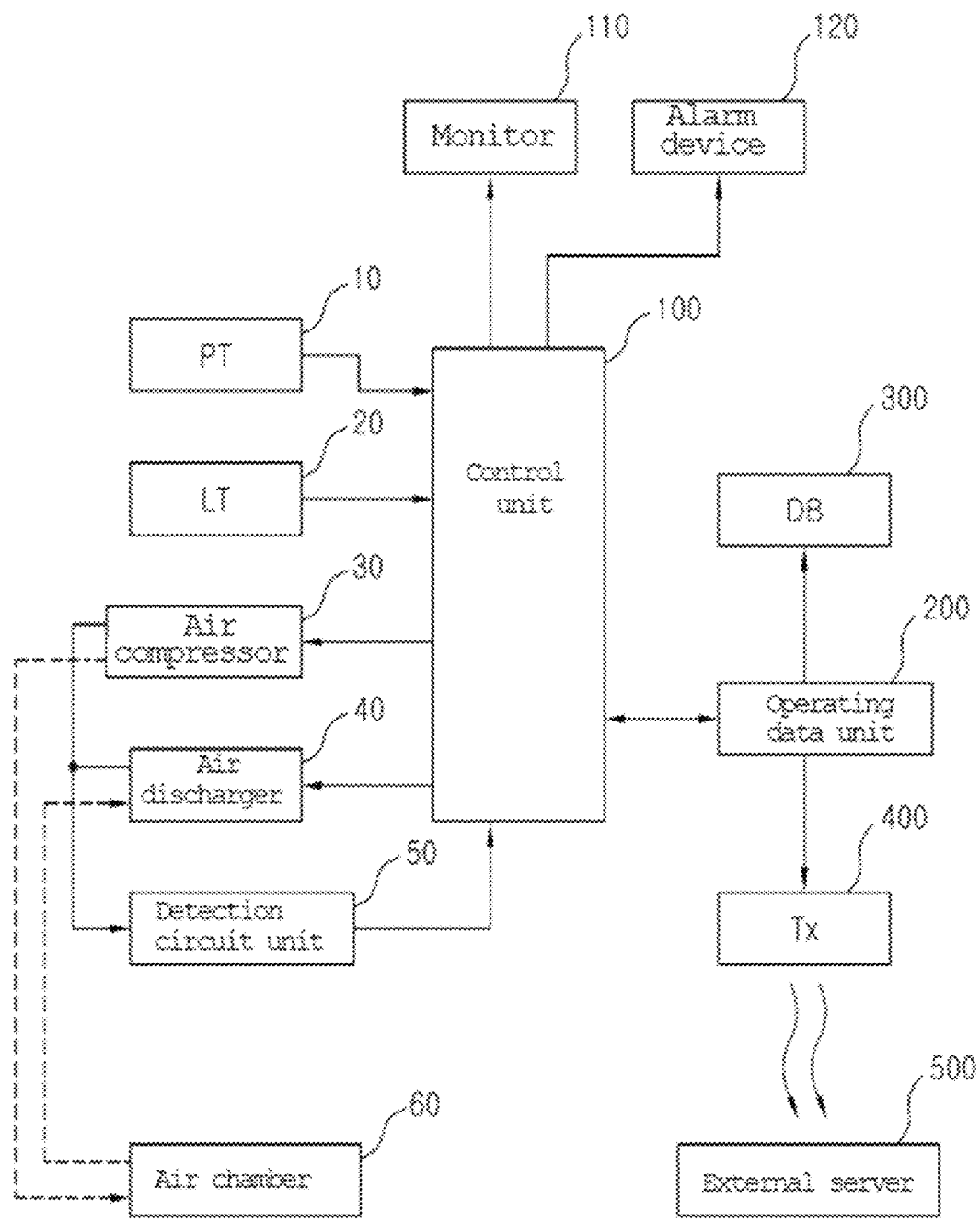
FIG. 3 is a block diagram of a water-hammering prevention system based on an operating state analysis algorithm according to the present invention.

That is, as shown in FIG. 3, in the present invention, data measured in real time by a pressure sensor (PT) 10 and a water level sensor (LT) 20 is transferred to a control unit 100. The control unit 100 includes an air chamber for preventing water-hammering by controlling the operation of an air compressor 30 and an air discharger 40. The data transferred in real time by the pressure sensor 10 and the water level sensor 20 is stored in a database (DB) 300 through an operating data unit 200 or transmitted to an external server 500 through a transmission unit (TX) 400. The control unit 100 computes data for the operating state of the air compressor 30 and air discharger 40 transferred by a detection circuit unit 50, a real-time pressure value transferred by the pressure sensor 10, and a real-time water level value transferred by the water level sensor 20 according to the operating state analysis algorithm. Measures capable of preventing water-hammering can be taken through water-hammering equipment based on the results of the computation.

In this case, the detection circuit unit 50 is electrically connected to the air compressor 30 and the air discharger 40. If an overcurrent or overvoltage is detected by the air compressor 30 and the air discharger 40, the detection circuit unit 50 generates a separate control signal and transfers whether abnormality has occurred in the corresponding apparatus to the control unit 100.

If air within a pressure tank is insufficient, it is difficult to handle a sudden change in pressure. As a result, it may be said that an apparatus having a capacity smaller than a required capacity has been installed. Accordingly, the apparatus needs to be carefully driven because an accident may occur.

Furthermore, if excessive air is retained in the pressure tank, the internal air may be lost due to excessive expansion when pressure is reduced. In this case, it is difficult to suppress a sufficient pressure drop, and a phenomenon called a slam surge is generated because the drained air exits through an air valve, thereby causing an accident.

The air drained into a pipeline makes the pipeline an unstable state, thereby making control difficult, or stays in the peak part of the pipeline to hinder a flow of a moving fluid.

Pressure in a pump system does not always operate regularly, but is always changed due to various conditions, such as the driving of the pump or a change of the operating pump, a manipulation of a valve, the stop of the pump and an operating change of a pipeline system. Although the air chamber can guarantee safety, a change in the volume of air within the pressure tank attributable to a change in pressure cannot be handled using an existing control method of controlling the amount of air based on a water level simple. Accordingly, safety cannot be guaranteed because a proper amount of air is not maintained.

A rise of a water level in periodical changes that do not respond to a change of pressure is the leakage of compressed air. In this case, there is damage in the portion of an air layer (or air supply line). An administrator can recognize the operating state and water-hammering of each apparatus (the air compressor, the air discharger, etc.) based on the results of the computation (data or graph) of the operating state analysis algorithm displayed on a monitor 110 by the control unit 100.

Furthermore, if the apparatus does not operate although the water level rises in a normal pressure range, it results from a failure of the apparatus. The control unit 100 generates an emergency alarm through an alarm device 120. The control unit generates an emergency alarm through the alarm device 120 although water-hammering occurs due to a change in pressure and the water level.

In order to always secure safety in response to a change of pressure, there is a need for the operating method of the apparatus associated with a change of pressure not a simple change of the water level. Accordingly, if a change of pressure and a change of the water level are actively analyzed and controlled, safety can be secured using the equipment of a proper capacity.

To this end, in an embodiment of the present invention, changes of pressure and water level are stored in the database 300 in a time table structure, such as FIG. 4.

The time table is divided into 7 items, including a site name, time, water level, pressure, state, abnormality and operation, and data is stored for each second. Accordingly, the results of analysis are immediately displayed in each line formed per second.

For example, a water level and pressure are stored for each second with respect to a specific site. Normal, safety and the results of analysis of water-hammering determined by the operating state analysis algorithm are displayed in the "state" item in a 2-digit binary number in the same line. Whether each apparatus operates or not is displayed in the "operation" item in a 4-digit binary number in the same line. Whether each apparatus is normal or not is displayed in the "abnormality" item in a 4-digit binary number.

In this case, the 2-digit binary number of each item may be configured to display the current state of each apparatus.

Furthermore, if the operation variables obtained according to the present invention are applied to the water-hammering prevention equipment disposed in a site, automatic control can be controlled actively and stably. Safety can be secured because each apparatus can accurately operate and a failure or malfunction of the apparatus can be diagnosed. Furthermore, a cost for the unnecessary replacement of equipment can be reduced because the apparatus can be used for a long time.

The operating state analysis algorithm implemented according to the present invention is described in detail below.

The air chamber disposed for the safety of equipment, such as the pipe or apparatus, against water-hammering must maintain a proper amount of air therein. However, the volume of the internal air varies because pressure within the pipe is changed by the operating state of the pump or the manipulation of the valve. Accordingly, since the water level varies, it is difficult to adjust accurate air in controlling the compressor and the vent valve in response to the water level.

The air is a compressive moving fluid, and thus according to Boyle's law it becomes $$P \times V = C (\text{constant}) \quad \text{Equation (1-1)}$$

An air volume within the air chamber needs to be selected to have an accurate capacity through computation analysis. If air is unnecessarily discharged or additionally supplied during operation, safety cannot be guaranteed. Accordingly, the amount of the internal air must be accurately controlled.

In the present invention, the operation of the air compressor or air vent valve may be determined so that air necessary in each state becomes a proper amount of air when compared with the amount of air calculated upon design. A method of determining whether the air compressor and the air vent valve will be driven or not includes accumulating data for a specific period along with computation analysis and using the data as an average value and an instantaneous value so that a variable capable of verifying the current operating state can be found. It may be seen that as the volume varies in response to pressure, a corresponding factor is obtained from Equation (1-1) and a change of the volume is in reverse proportion to pressure if a temperature is constant. If pressure within the pipe rises, water flows into the air chamber. Accordingly, the water flows into the space in which air was present within the air chamber, thereby reducing the air volume and raising pressure. The pressure compresses the air so that it becomes equal to the pressure within the pipe.

The variables, such as pressure and the air volume, may be different for each site. Accordingly, $\Delta pv$ (%) was introduced in order to generalize the variables. A change of a value obtained by multiplying the pressure and the air volume was used as a variable and verified.

$$\Delta pv(\%) = \{\Delta(p_i \cdot v_i)/(p_m \cdot v_m)\} \ast 100 \quad \text{Equation (1-2)}$$

Equation (1-2) was applied upon design and site operation. $(p_i \cdot v_i)$ is a time-varying value and used to set the conditions of the operation. $(p_m \cdot v_m)$ was applied by checking that an average of regular values is proper. The reason why the value of $(p_m \cdot v_m)$ is not applied to the conditions upon design is that the conditions of a pipeline are changed over 10 years or 20 years and there is a problem in incorporating the design conditions because the operating conditions of the pump do not always remain as design conditions.

Accordingly, if the $\Delta pv$ is within a set value, the control unit 100 may determine that the corresponding water-hammering equipment is normal or is operating. The set value varies depending on the apparatus, but has only to maintain a range of ±10 according to an embodiment of the present invention.

The water-hammering prevention apparatus needs to protect the equipment even in the worse situation. Operating conditions to be prepared may be different because all of situations are not the same. That is, when an accident occurs while a situation in which an accident may occur is prepared, the water-hammering prevention apparatus protects the pipeline and the apparatuses, and thus needs to be properly prepared for various conditions at normal times. The conditions of the pipeline vary over time, and thus may become the worst situation after a lapse of a long time of several years or several tens of years. Accordingly, an apparatus necessary for water-hammering needs to operate by also taking into consideration a change of the lapse of time.

If a pipeline has long been buried in a site, it is difficult to accurately check the depth or the location of the pipeline and thus the operating state analysis algorithm cannot be applied. Accordingly, the results of research of 5 sites are described below.

The water-hammering prevention apparatus for experiments must have a proper amount of air therein. A portion for detecting whether the amount of air is proper is the water level sensor (LT) 20. If the amount of air is insufficient, the air compressor 30 is driven and an electronic valve connected thereto is open to supplement air. If air is excessively present, the electronic valve of the air discharger 40 is open to reduce the amount of air so that the water level rises. Such operating data of the apparatus is stored in the operating data unit 200.

When a normal operation is performed, compressed air within the air chamber 60 must maintain an accurate design value by the automatic control circuit of the site control panel. When the air chamber 60 normally operates, the initial air volume needs to maintain the capacity of design conditions. A determination of control water levels (HHH, HH, H, L, LL and LLL) during operation is suggested upon design based on the results of analysis of a water-hammering phenomenon and is an important factor in operation.

Furthermore, the setting of a control water level within the air chamber 60 needs to be determined based on the results of analysis of water-hammering and the results of a test operation after the air chamber 60 is installed. Major measurement apparatuses and attached apparatuses thereof need to be adjusted between 0~100% of a manipulation water level depending on required conditions.

*For example,

1) Level 1 (LLL): Lowest water level warning

The air chamber must set and operate a water level so that it does not operate in the level 1 or less. If the water level within the air chamber drops to the level 1 or less, air may be introduced into the pipe. Accordingly, when the water level reaches the level 1, warning indication is driven.

2) Level 2 (LL): Vent valve opening water level

3) Level 3 (L): Compressor stop water level

It indicates the lower limit of a normal operation state water level. When the water level reaches the level 3, the operations of both the main compressor and the sub-compressor are stopped.

4) Level 4 (H): Compressor driving water level

It indicates the upper limit of the normal operation state water level. When the water level reaches the level 4, the main compressor is driven.

5) Level 5 (HH): Sub-compressor driving water level

When the water level reaches the level 5 in the normal operation state, the sub-compressor is driven and an alarm indicative of an abnormal state is displayed.

6) Level 6 (HHH): Highest water level warning

When this water level is reached in the normal operation state, the air chamber can be no longer an effective water-hammering reduction apparatus, and thus an alarm sound is generated.

Meanwhile, operating conditions in which the control water level is reached are as follows.

1) Normal operation state in which all of the pumps are driven

In the normal operation state of the pump, the water level of the air chamber must operate between the level 3 and the level 4. However, air within the air chamber is dissolved in water during operation. Accordingly, when pressure of compressed air is lowered and the water level rises and reaches the level 4, the air compressor must operate to lower the water level within the air chamber up to the level 3 and the air compressor must be stopped. If the water level reaches the level 2 because the compressor malfunctions due to a failure of the control unit, a warning signal is generated.

2) When the pump starts up

When the pump starts up, the water level within the air chamber also rises in response to a rise of the discharge pressure of the pump. In this case, time delay for providing an interval for a specific time to the control (startup) signal of the compressor so that the compressor does not repeat the on/off process for a short time due to the fluctuation of a water level when the pump starts up is disposed in the control panel. In this case, the necessary first time interval is set based on the results of simulation analysis, and the final time interval after a site test is set. An air compressor operation after the water level within the air chamber becomes the normal state.

3) When the pump is stopped

When the pump is stopped in the normal state, the pumps are stopped stepwise one by one. The water level within the air chamber drops in proportion to pressure within the pipe of the main water transmission pipeline. When the water level within the air chamber reaches the level 2 in the state in which the air compressor does not operate, the vent valve disposed over the air chamber is open, and thus compressed air must be discharged until the water level within the air chamber reaches the level 3.

4) When the pump is stopped in emergency

When power is full blocked due to an accident or power failure of the electrical panel in a pump station, all the pumps of the pump station are stopped at the same time. At this time, the greatest load is applied to the air chamber. Pressure within the pipeline abruptly drops. At this time, the compressed air within the air chamber discharges water within the air chamber to the pipeline. Thereafter, the water level of the air chamber repeatedly rises or drops in response to a change in the pressure of the pipeline, and thus is gradually stabilized. Accordingly, an interruption power supply must be connected to the pressure meter and the water level meter so that they can secure stable operating data when a power failure occurs.

Meanwhile, in the present invention, pressure and water level values are stored through the sensors 10 and 20 mounted on the air chamber 60. The pressure sensor is connected to the main pipe through a pipe, and thus pressure within the pipe is directly transferred to the air chamber 60. Pressure within the pipe has an error corresponding to a height difference between the main pipe and the air chamber 60, but the error may be corrected as the numerical value of the pressure sensor and the pressure value of the air chamber 60 may be indicated as pressure within the pipe. Pressure within the pipe may be used as an accurate value if a correction value is added to pressure measured by the air chamber 60. Furthermore, the water level is transmitted to the air chamber 60, and the water level within the air chamber 60 is the same as the amount of retained water. Accordingly, the amount of water supplied to the pipe can be aware.

The range of the measuring device used was determined based on the results of performance-predicted computation with respect to the entire system, and the devices having a fast response speed over time were selected. In the experiment apparatus, a data logging apparatus was formed using NI USB-6251 model having resolution of 16 bits, the entire system was controlled using the pressure sensor that might have an error of a maximum of 0.129% in pressure, and a corresponding value was output. The pressure sensor applied to a site has about 0.06%.

For the experiments, a current (voltage) measured in the state in which the pump normally operated was recorded. Pressure and a water level indicated in the control panel were recorded. The pressure meter and water level meter, that is, devices capable of being read by an eye, were read to check whether the read values were normal or not compared to values displayed in an LCD window provided in the control panel. Accordingly, whether the valve state and connection state of each apparatus are normal were checked. The apparatus was configured so that data output as a current value could be indicated as a voltage value using precise resistance (250Ω, 0.1%).

The number of data that may be obtained through the apparatus was 8 (operating data, such as pressure and a water level). A signal now connected to the apparatus was configured to store signals, such as pressure within the air chamber and the water level of each air chamber.

First Embodiment

Site Operating Data—Stable State

Figure 5:
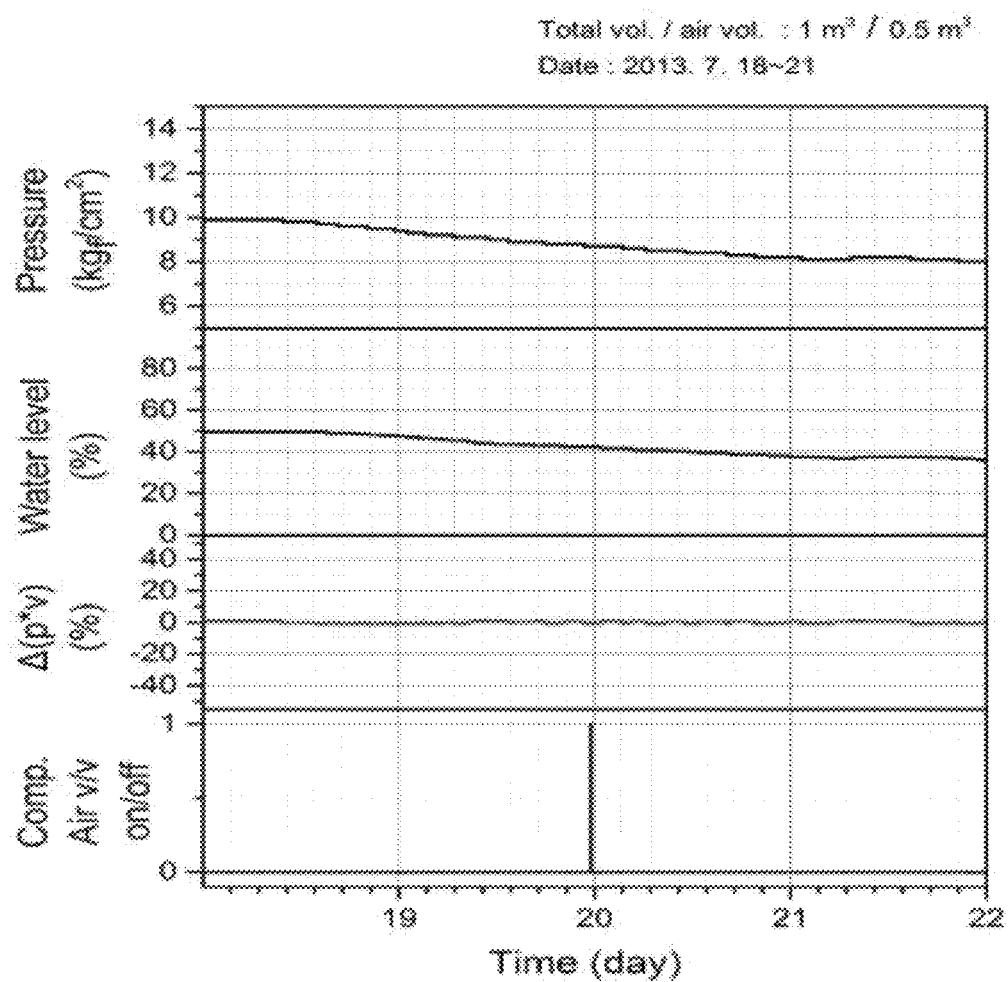
FIGS. 5 to 13 are data tables for the operating state of an air chamber classified for each period in each site according to an embodiment of the present invention.

As shown in FIG. 5, it may be seen that operating data for four days from Jul. 18, 2014 shows that pressure slowly dropped and thus the internal air was expanded and the water level also gradually dropped. This situation means that if the variables of the present invention are incorporated, a stable operation is performed because there is no change in the variable value. That is, the amount of air is proper.

Figure 6:
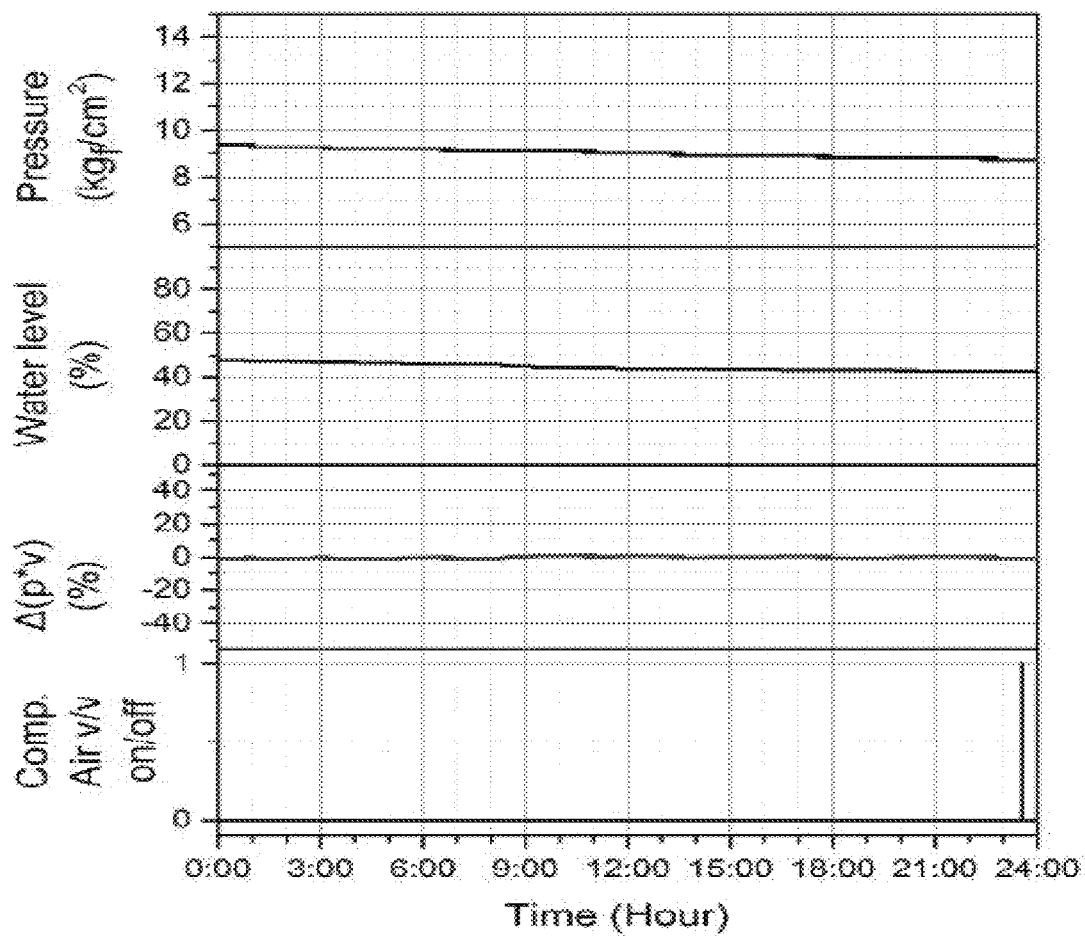

Furthermore, as shown in FIG. 6, operating data in Jul. 19, 2014 shows that although an internal air volume varied in response to a change in pressure, this is not the state that requires the operation of another device, but is the state that does not require a separate operation even in a change of the water level. The air compressor was driven at 11:30 p.m., but was driven for about 3 seconds in order to prevent a reduced lifespan or a failure, such as fixing, if the air compressor does not operate for a long time.

Figure 7:
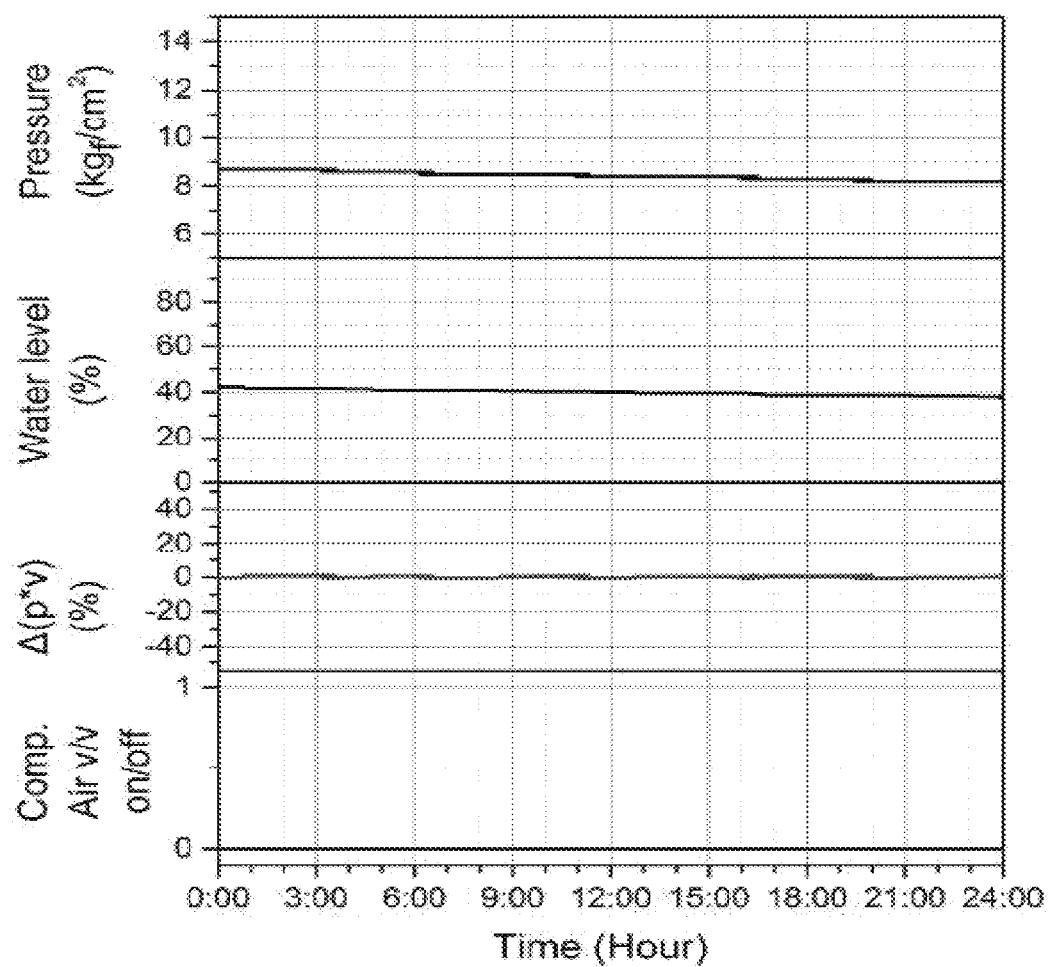

Furthermore, as shown in FIG. 7, operating data in Jul. 20, 2014 shows that the internal air volume varied in response to a change in pressure, but is not the state that requires the operation of another device and is the state that does not require a separate operation even in a change of the water level. It may be seen that there is a great effect if control is performed using air pressure and a change of the volume as parameters.

Second Embodiment

B Site Operating Data—Instable State (Upper Air Leakage)

Figure 8:
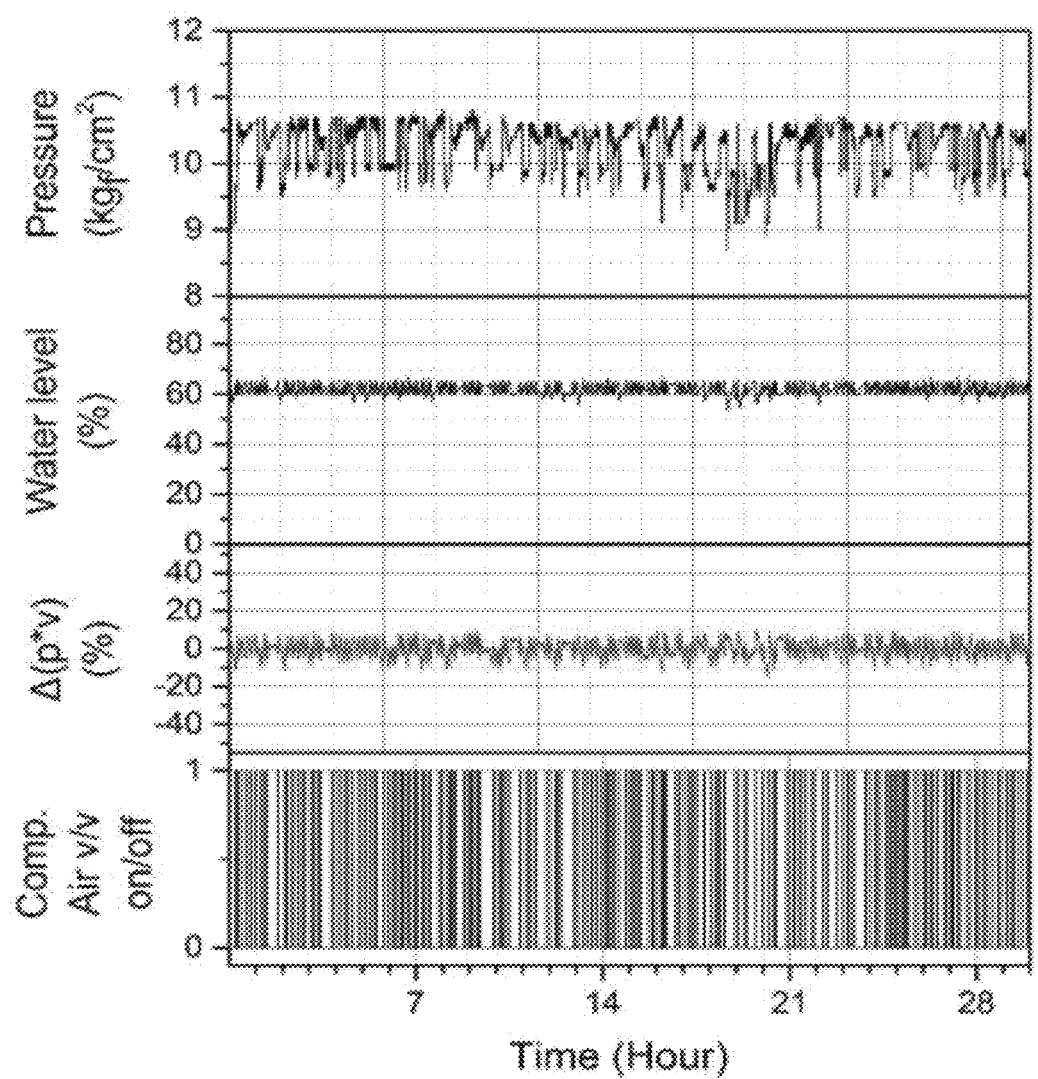

As shown in FIG. 8, it may be seen that operating data for 30 days from Sep. 1, 2013 shows that pressure was changed during operation and thus the water level was also changed. The compressor was frequently driven in addition to a change of the pressure. It may be seen that if the variables of the present invention are incorporated, a periodical change is generated in the variables and the air compressor is driven.

Figure 9:
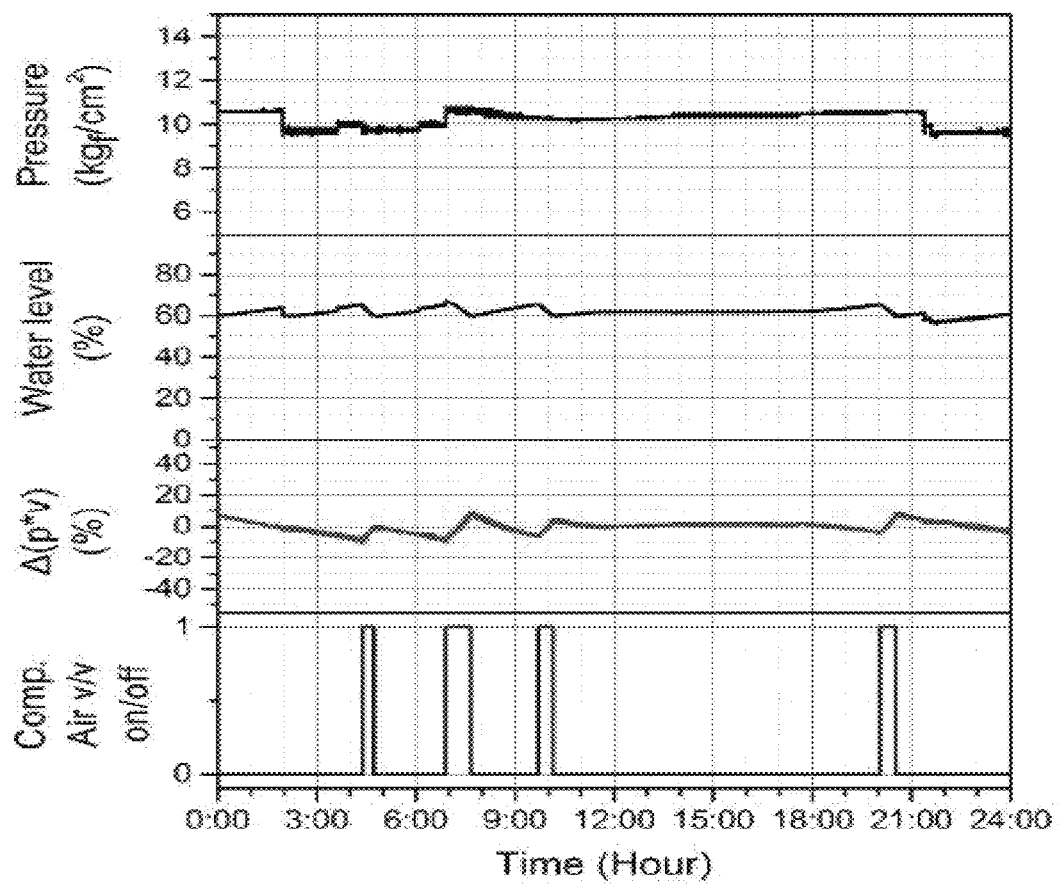

Furthermore, as shown in FIG. 9, operating data in Sep. 2, 2013 shows that pressure was changed and thus the water level was changed, but there was another change in the water level. The compressor was frequently driven in addition to the change of pressure. This situation means that the inlet and outlet of air are present regardless of a change of pressure because there is a periodical change if the variables of the present invention are incorporated.

Figure 10:
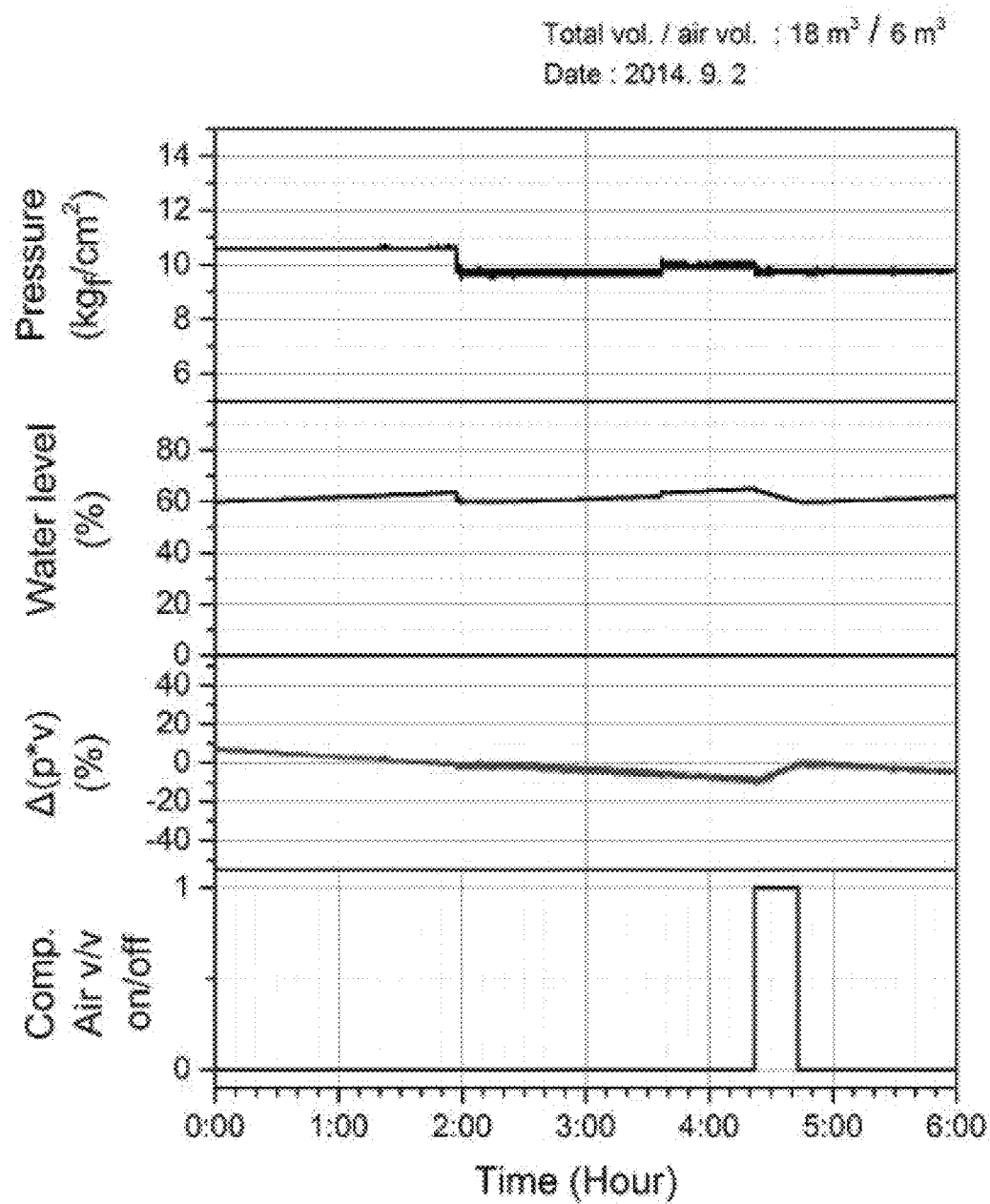

Furthermore, as shown in FIG. 10, operating data from 0 o'clock of Sep. 2, 2013 to 6 o'clock shows that there was a rise of the water level although pressure was not changed and such an influence acts greater than a change in pressure. This means that the inlet and outlet of air are present regardless of a change of pressure and air is drained due to some damage or malfunction of the apparatus if the variables of the present invention are incorporated.

Third Embodiment

C Site Operating Data—Normal Operation (Air Compressor is Driven)

Figure 11:
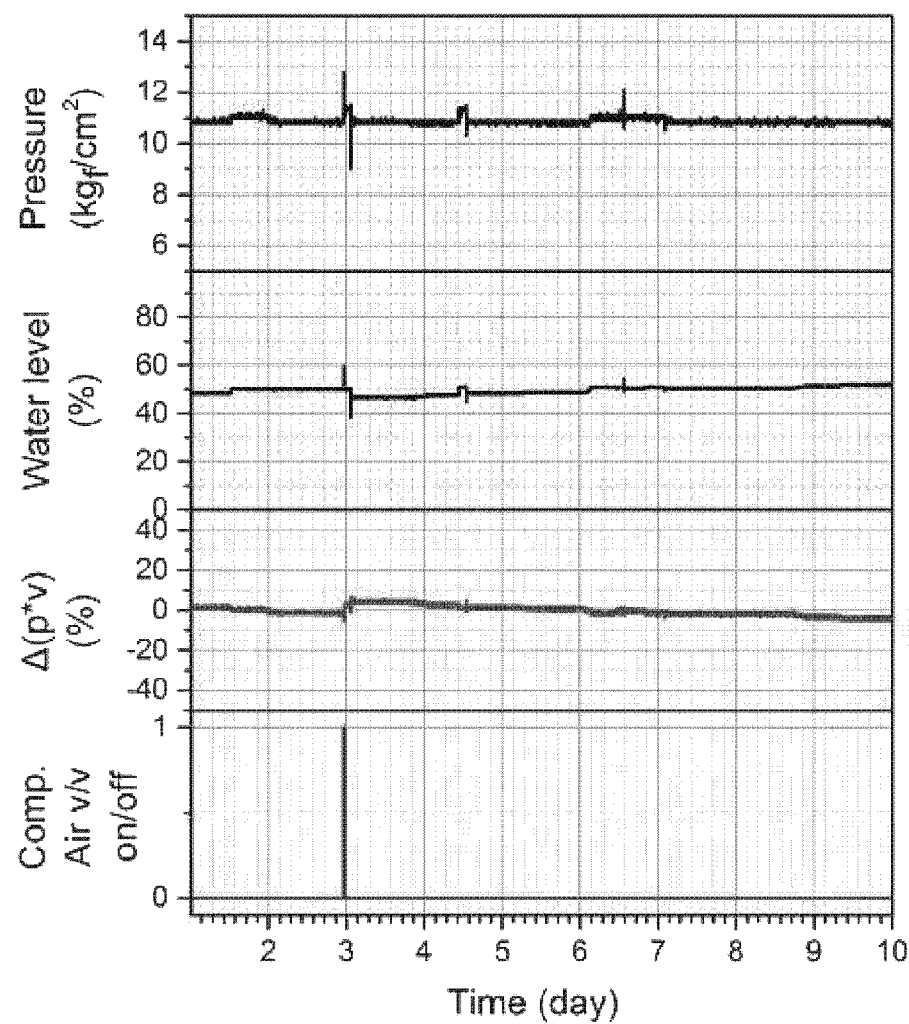

As shown in FIG. 11, operating data for 9 days from Apr. 1, 2014 shows that the water level varies in response to a change of pressure. The compressor was driven for 3 days in order to meet a normal water level. When the variables of the present invention was applied to the situation, a stable operation was performed without an almost change.

Figure 12:
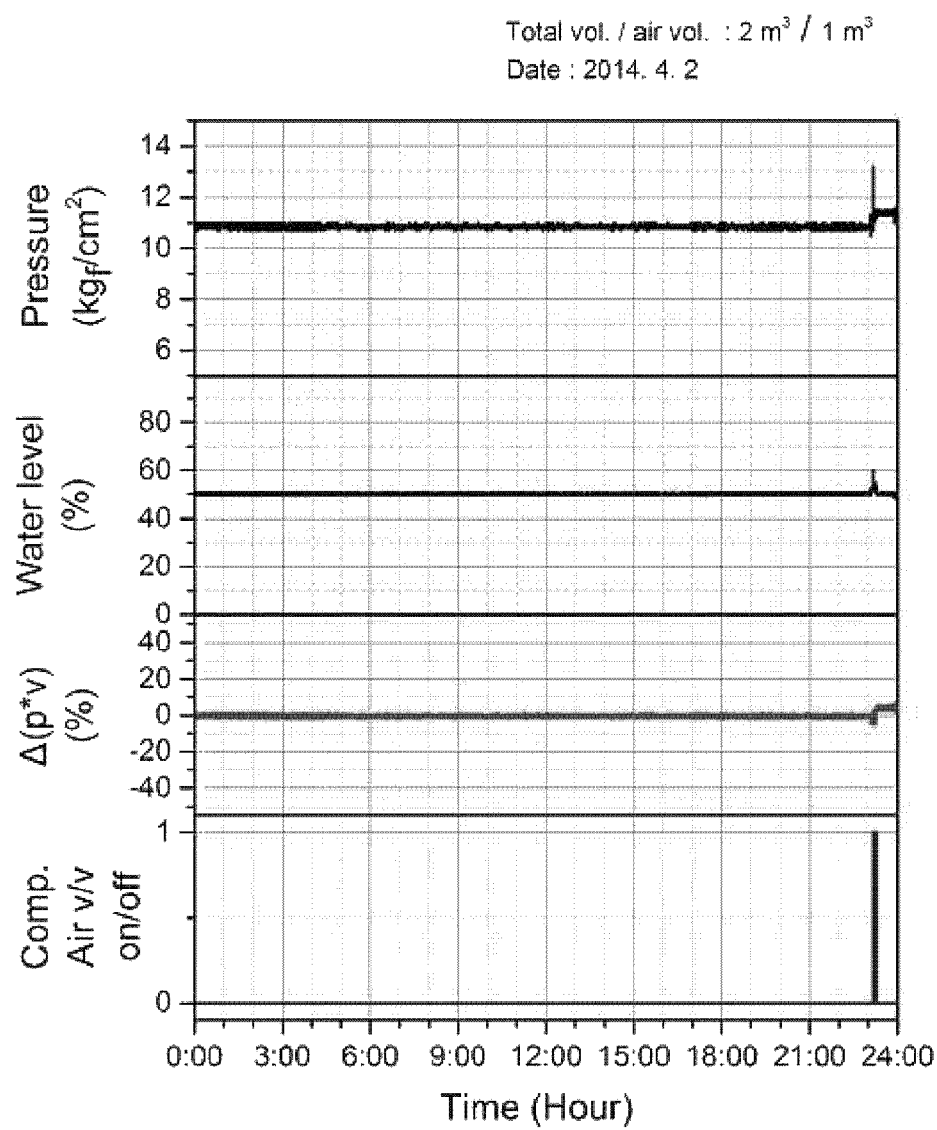

Furthermore, as shown in FIG. 12, operating data in Apr. 2, 2014 shows that there was no change of pressure and thus the internal air volume was rarely changed, but pressure was changed after 23 hours and thus the water level was changed. The water level was lowered and a stable operation was performed through the operation of the air compressor for a short time.

Figure 13:
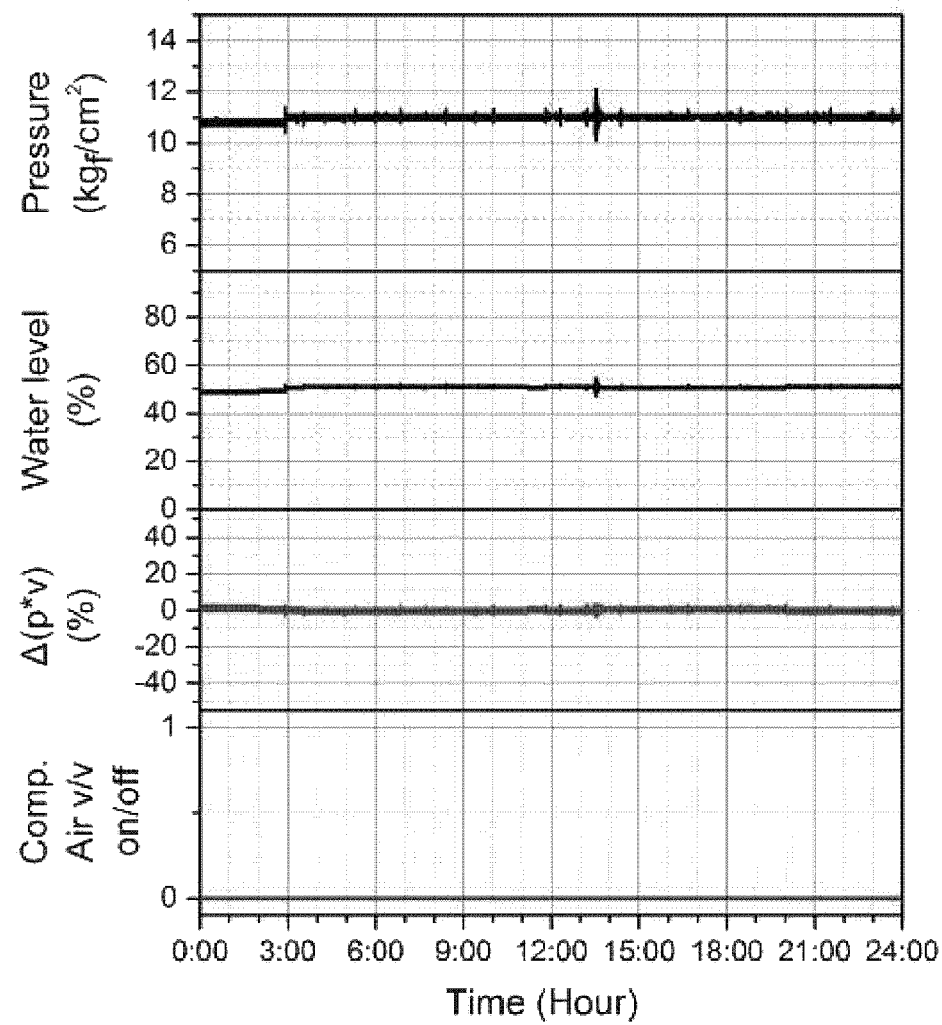

Furthermore, as shown in FIG. 13, operating data in Apr. 6, 2014 shows that the internal air volume varied in response to a change in pressure, but is not the state that requires the operation of another device and is the state that does not require a separate operation even in a change of the water level. It may be seen that there is a great effect if control is performed using air pressure and a change of the volume as parameters.

A common water-hammering prevention apparatus has a difficulty in storing operating information, must use an expensive experiment apparatus in order to analyze the operating information, and requires a lot of time. In order to install the common water-hammering prevention apparatus, separate processing must be performed on the existing facility or apparatus or a lot of equipment must be attached to a facility.

Furthermore, in order to install a data acquisition apparatus for obtaining operating data, the operation of the water-hammering prevention apparatus must be stopped. Accordingly, data can be obtained only in a specific period. Furthermore, after the data is analyzed, a separate schedule must be determined in order to remove the data acquisition apparatus. That is, the operation of the apparatus must be stopped for the tasks of installing the data acquisition apparatus, storing the operating data and removing the data acquisition apparatus.

As described above, the water-hammering prevention apparatus must be disposed in a site to obtain data, and an apparatus must be developed using the results of the data or the results of the data must be incorporated into management. If such data has not been secured and information obtained from a specific site is applied to the entire system, it is difficult to secure the safety of the site and such data is applied as previous data if a situation is different, leading to a severe accident.

The water-hammering prevention apparatus must be able to protect a facility even in the worst situation. Operating conditions that must be prepared may be different because all of situations are not the same. That is, when an accident is generated while the situation of an accident unknown to occur when is prepared, the pipeline and the apparatus must be protected, and thus various conditions at normal times must be properly prepared. The apparatus necessary for water-hammering must be driven by taking into consideration a change in the lapse of time because the worst situation may occur even after a long time of several years or several tens of years.

A change in the pressure and volume of air within the water-hammering prevention equipment that uses air, that is, a compressive moving fluid, has a constant tendency. It was found that a damaged or broken portion of the apparatus in addition to an error of an operating method can be detected through site experiments if this tendency is used.

In a normal operation, a change of pressure appears as a change of air volume. If such a change is used, safety can be secured and energy can also be reduced. If a change of pressure is not used, a change of the volume may be a failure of the sensor or the valve or a malfunction of a device, such as the air compressor. If a change of pressure is greatly exceeded due to other influences, damage or malfunction of the device can be checked. If the device is damaged, the leakage of air can be previously checked, thereby being capable of preventing an accident.

A rise of the water level in periodical changes not corresponding to a change of pressure is the leakage of compressed air. It could be seen that a portion of the air layer (or air supply line) was damaged. Furthermore, a rise of the water level in the normal pressure range is a failure of the apparatus if the apparatus does not operate. At this time, an alarm must be generated.

If Equation (1-2), that is, the operation variable according to the present invention, is applied to the water-hammering prevention equipment installed on a site, automatic control may be performed actively and stably. Accordingly, the apparatus can be accurately driven, and safety can be secured because a failure or malfunction can be diagnosed. Furthermore, cost for the unnecessary replacement of a facility can be reduced because the apparatus can be used for a long time.

In conclusion, the present invention is described as follows.

1) The air chamber for preventing an accident that may not be expected in a normal operating state has stored data related to an abnormal electric current or water level, such as in the motor, so far. However, for an accurate operation, operating data including pressure and a water level by which the operating state can be verified needs to be stored, and it is necessary to analyze the stored data. The data needs to be stored for a week or more for each second because accurate analysis is difficult based on data for several minutes.

2) An operation for controlling the amount of air of the air chamber is performed by the air compressor and the air valve, that is, some of the apparatus. The amount of air is controlled by checking a water level using the internal sensor and driving the air compressor and the air valve. The lapse of time or a failure cannot be recognized and an emergency operation cannot be properly handled using an operating method simply corresponding to an instant water level value, thereby being capable of causing a severe accident. Accordingly, since the water level is different depending on pressure, the water level is differently set so that control of the water level operates in conjunction with pressure.

3) In the operation of the air chamber, a set amount of air must be kept in the normal operation. Since a proper amount of air must be always kept, pressure and a water level within the air chamber must be stored. If an operation deviates from a normal range, it is necessary to generate an alarm so that an administrator can check the operation.

4) The control unit must be able to check a normal operation for output in addition to a failure of the apparatus for the input of the sensor. It is necessary to check that there is no abnormality by comparing the output of the control unit with the operation of the apparatus. A verification method includes checking whether the output signal of the control unit is delivered to the apparatus and checking whether the apparatus accurately operates, and includes detecting and comparing whether the apparatus operates although there is no output signal of the control unit.

5) In the operating state analysis algorithm according to the present invention, the variable, such as pressure or an air volume for checking the integrity of the apparatus, may be different for each site. In order to generalize the variable, $\Delta pv$ (%) has been generated. A change of a value obtained by multiplying pressure and the volume has been verified using the value as the variable. An equation for checking the integrity of the water-hammering prevention system has been set as "$\Delta pv\ (\%)=\{\Delta(p_i \cdot v_i)/(p_m \cdot v_m)\}*100$." $(p_i \cdot v_i)$ is a time-varying value and is for setting conditions of an operation. $(p_m \cdot v_m)$ has been applied by checking that an average of regular values is proper.

6) A method of analyzing operating data includes averaging stored pressure values and water level values on a weekly or monthly basis, comparing the values in order to check that the current state corresponds to which degree, and checking that the current state is a proper operating state if a result of the comparison is within a specific range. If such a tendency is stored and notified, an unmanned safety apparatus can be achieved.

7) If the value of the variable increases and deviates from a specific range (for example, varies ±5 or more), it results from increased pressure, compressed air within the air chamber, and a rise of the water level. If the pressure is stabilized and becomes normal pressure after a while, the water level will become a normal water level. Accordingly, a separate apparatus does not need to be driven. This corresponds to a case where the air compressor is driven to supply air, and thus it is necessary to set the operating set value of a separate compressor.

8) If the value of the variable decreases and deviates from a specific range, it means that the state has become the state smaller than a proper amount of air. It is necessary to repair the apparatus because air is not supplied due to the leakage of air or a failure of the apparatus.

9) If the value of the variable is repeated in a specific cycle, it can be seen that the leakage of air and the supply of air are repeated. If such a phenomenon is generated, it may be seen that there is leakage in a specific portion connected to the apparatus and the air compressor is driven in order to supplement the insufficient air. Leakage from the pipeline in addition to a failure of the apparatus, such as the air compressor and the air valve, can be checked. Accordingly, if a broken or damaged portion is repaired using the change value of the variable, the safety of a facility can be guaranteed.

10) If the value of the variable is repeated in a specific cycle, a periodical change is generated although repair has been performed due to the leakage of air. In this case, it can be seen that there is leakage in another place in addition to the repaired place, and thus repair for supplementing such leakage is performed. As described above, if the variable is used, whether a broken portion has been normally repaired can be checked.

11) A set value can be adjusted and a proper repair work can be performed because a failure location can be checked in addition to the operation of the apparatus. Accordingly, if the operating state analysis algorithm of the present invention is applied to a site where the air chamber has been disposed, required repair can be performed, safety can also be secured, and the waste of a cost attributable to the unnecessary replacement or exchange of a facility can also be reduced.

If Equation (1-2), that is, the operation variable according to the present invention, is applied to the water-hammering prevention equipment disposed in a site, automatic control and active and stable control can be performed. Accordingly, safety can be secured because the apparatus can be accurately driven and a failure or malfunction can be diagnosed. Furthermore, a cost for the unnecessary replacement of a facility can be reduced because the equipment can be used for a long time.

The invention claimed is:

1. A water-hammering prevention system based on an operating state analysis algorithm, comprising:
a pressure sensor to measure a real-time pressure value;

a water lever sensor to measure a real-time water level value;

a control unit comprising an air compressor, an air discharger and an air chamber, wherein the control unit receives data measured in real time by the pressure sensor and the water level sensor, wherein the air chamber prevents water-hammering by controlling operations of the air compressor and the air discharger, and wherein the control unit stores the measured data from the pressure sensor and the water level sensor in a database via an operating data unit or transmits the measure data to an external server via a transmission unit;

a detection circuit determines an operating state of the air compressor and the air discharger, and transfers the operating state to the control unit;

wherein the control unit computes operational data using the operating state analysis algorithm for the operating state of the air compressor and the air discharger, the real-time pressure value, and the real-time water level value, and the control unit determines whether a water-hammering equipment is operating normally or not based on results of the operational data computation to prevent water-hammering;

wherein the control unit utilizes the operating state analysis algorithm to determine a presence of compressed air leaks due to damage to a portion of an air supply line in response to a determination that periodical changes in a water level are unresponsive to increases in the pressure, and displays an emergency situation message in a monitor;

wherein the air chamber is configured to hold a designed amount of air;

wherein the control unit applies P×V=C (constant) to the operating state analysis algorithm according to Boyle's law regarding an inverse proportion between a pressure and a volume in response to a determination that the designed amount of air is maintained within the air chamber and the air within the air chamber is a compressive moving fluid;

wherein in response to a determination that a time-varying value is $(p_i \cdot v_i)$ and an average value of the time-varying values is $(p_m \cdot v_m)$, the control unit computes a change in the time-varying value by multiplying the pressure and the volume using a variable of $\Delta pv$ (%)=$\{\Delta(p_i \cdot v_i)/(p_m \cdot v_m)\}100$ value; and wherein in response to a determination that the $\Delta pv$ is within a predetermined value, the control unit determines that a corresponding water-hammering apparatus is operating normally.

2. The water-hammering prevention system of claim 1, wherein the control unit utilizes the operating state analysis algorithm to determine a failure with a water-hammering apparatus in response to a determination that the water-hammering apparatus is not operational even as a water level rises in a normal pressure range; and wherein the control unit generates an emergency alarm through an alarm device in response to the failure determination of the water-hammering apparatus and in response to a determination that the water-hammering has occurred due to a change in the pressure and the water level.

3. The water-hammering prevention system of claim 1, wherein the detection circuit is electrically connected to the air compressor and the air discharger; and wherein in response to a detection of an overcurrent or overvoltage by the air compressor and the air discharger, the detection circuit generates and transmits a control signal indicating whether an abnormality has occurred in a corresponding water-hammering apparatus to the control unit.

4. The water-hammering prevention system of claim 1, wherein the database stores the measured data in a time table, the time table is divided into seven items comprising a site name, time, water level, pressure, state, abnormality and operation, the database stores the measured data for each second; and the control unit displays the operational data in each line of the time table, each line formed per second.

* * * * *